(No Model.) 4 Sheets—Sheet 1.
L. D. CASTLE.
MACHINE FOR REAMING AND TAPPING VALVES.
No. 512,155. Patented Jan. 2, 1894.
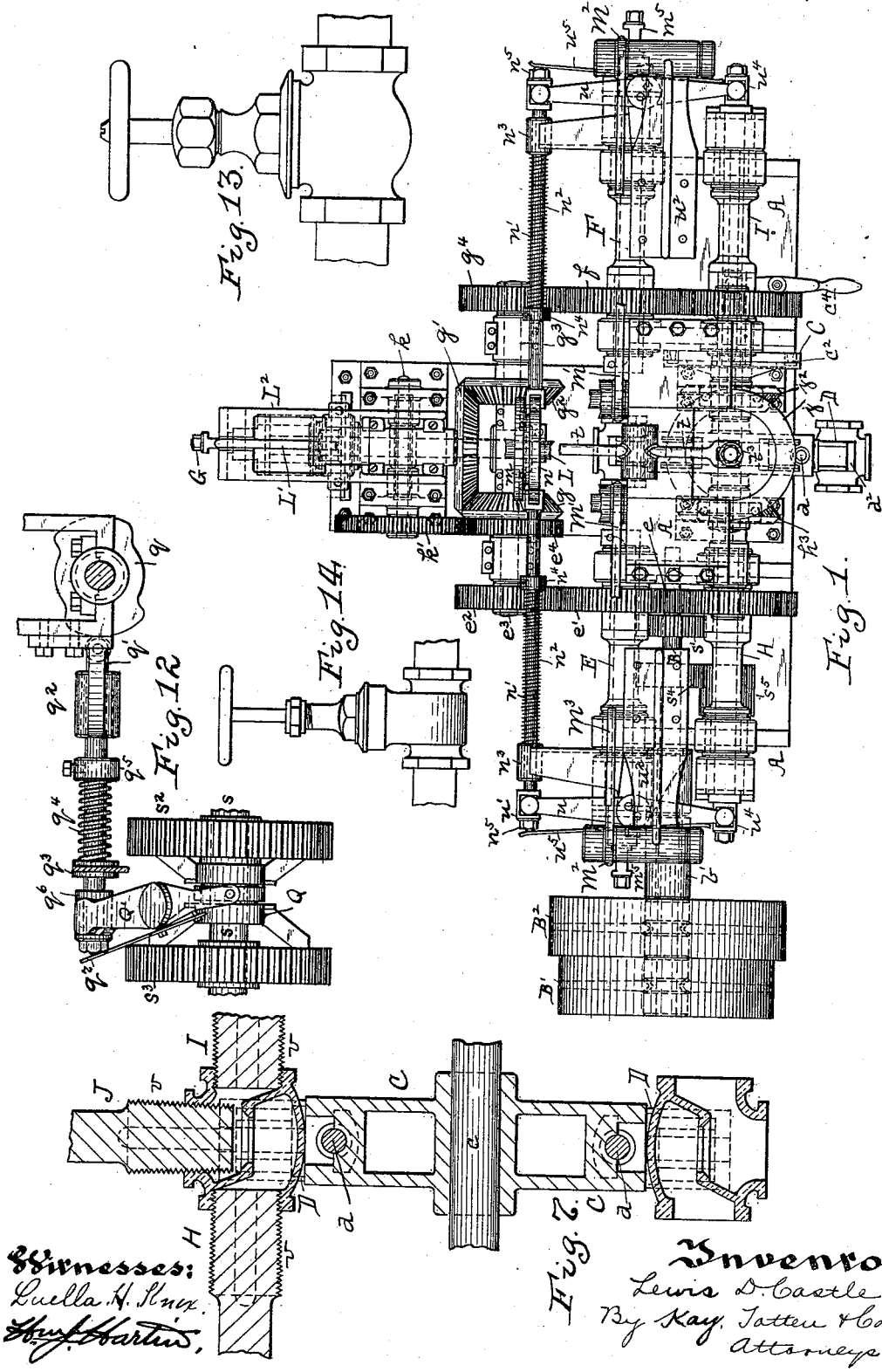
Witnesses:
Luella H. Knox
Henry J. Martin
Inventor
Lewis D. Castle
By Kay, Totten & Cooke
Attorneys.

(No Model.) 4 Sheets—Sheet 2.
L. D. CASTLE.
MACHINE FOR REAMING AND TAPPING VALVES.
No. 512,155. Patented Jan. 2, 1894.
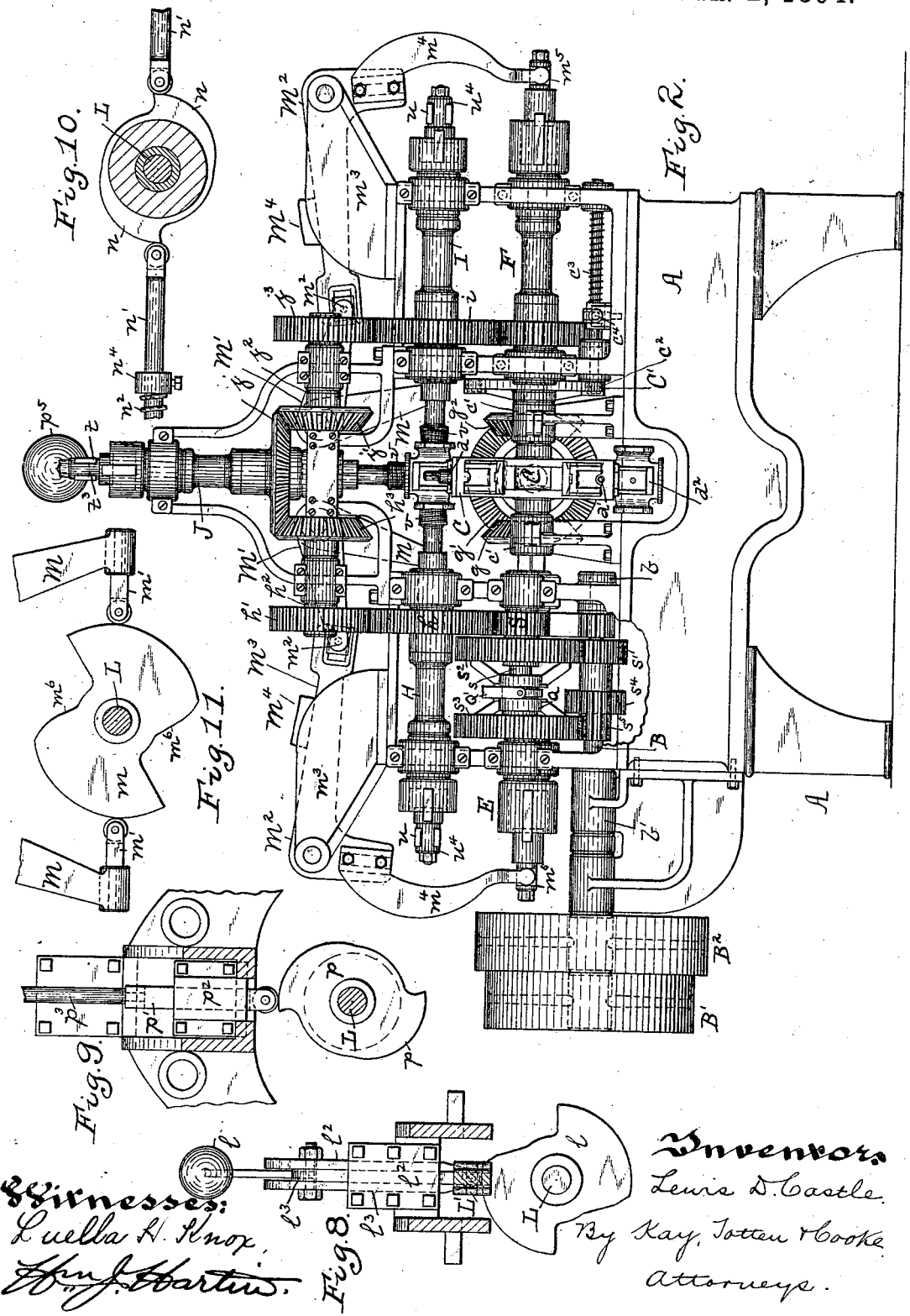
Witnesses:
Luella H. Knox
Wm. J. Hartin
Inventor:
Lewis D. Castle
By Kay, Totten & Cooke
Attorneys.

(No Model.) 4 Sheets—Sheet 3.
L. D. CASTLE.
MACHINE FOR REAMING AND TAPPING VALVES.
No. 512,155. Patented Jan. 2, 1894.
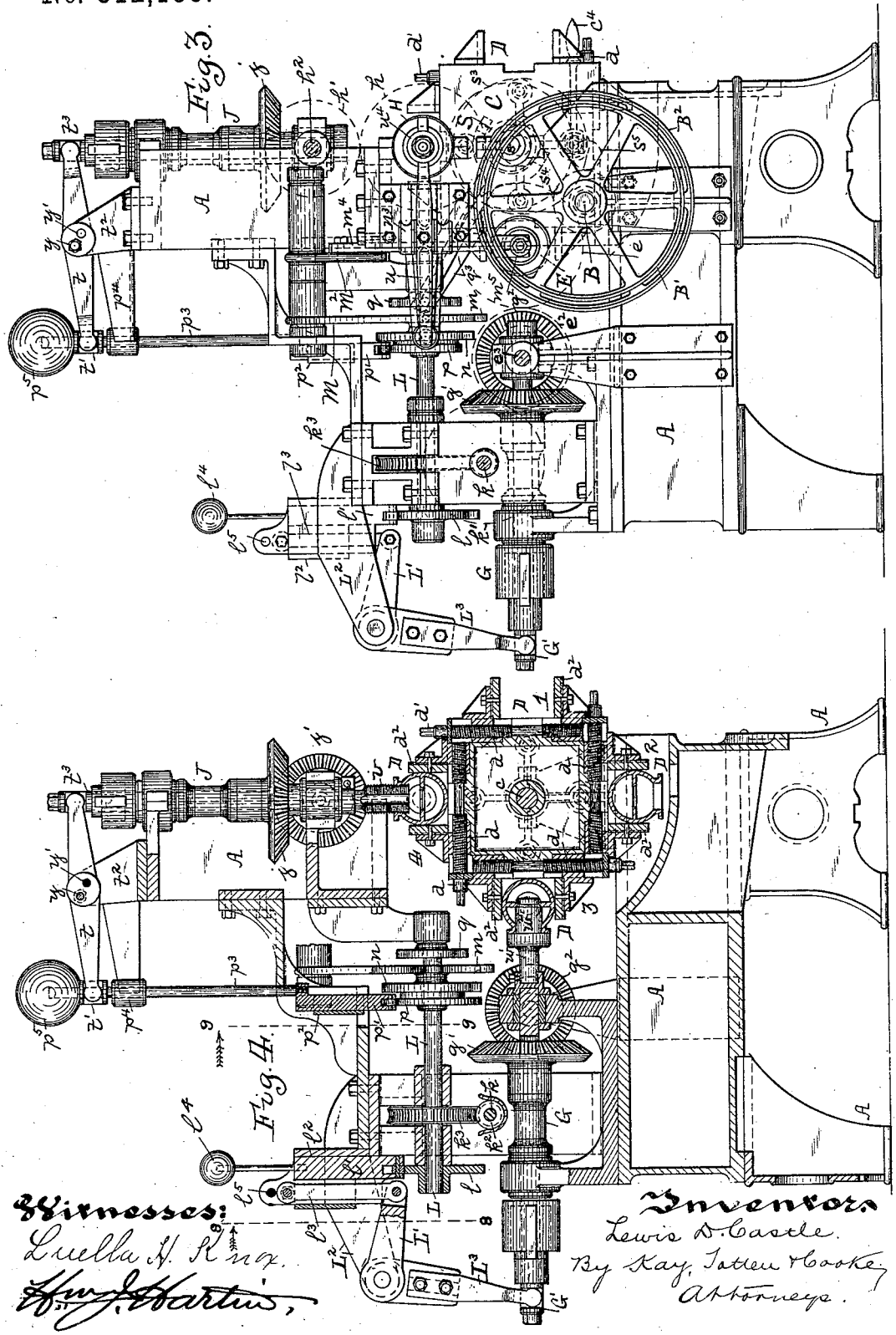
Witnesses:
Luella H. Knox.
Henry J. Martin.
Inventor:
Lewis D. Castle.
By Kay, Totten & Cooke,
Attorneys.

(No Model.) 4 Sheets—Sheet 4.
L. D. CASTLE.
MACHINE FOR REAMING AND TAPPING VALVES.
No. 512,155. Patented Jan. 2, 1894.
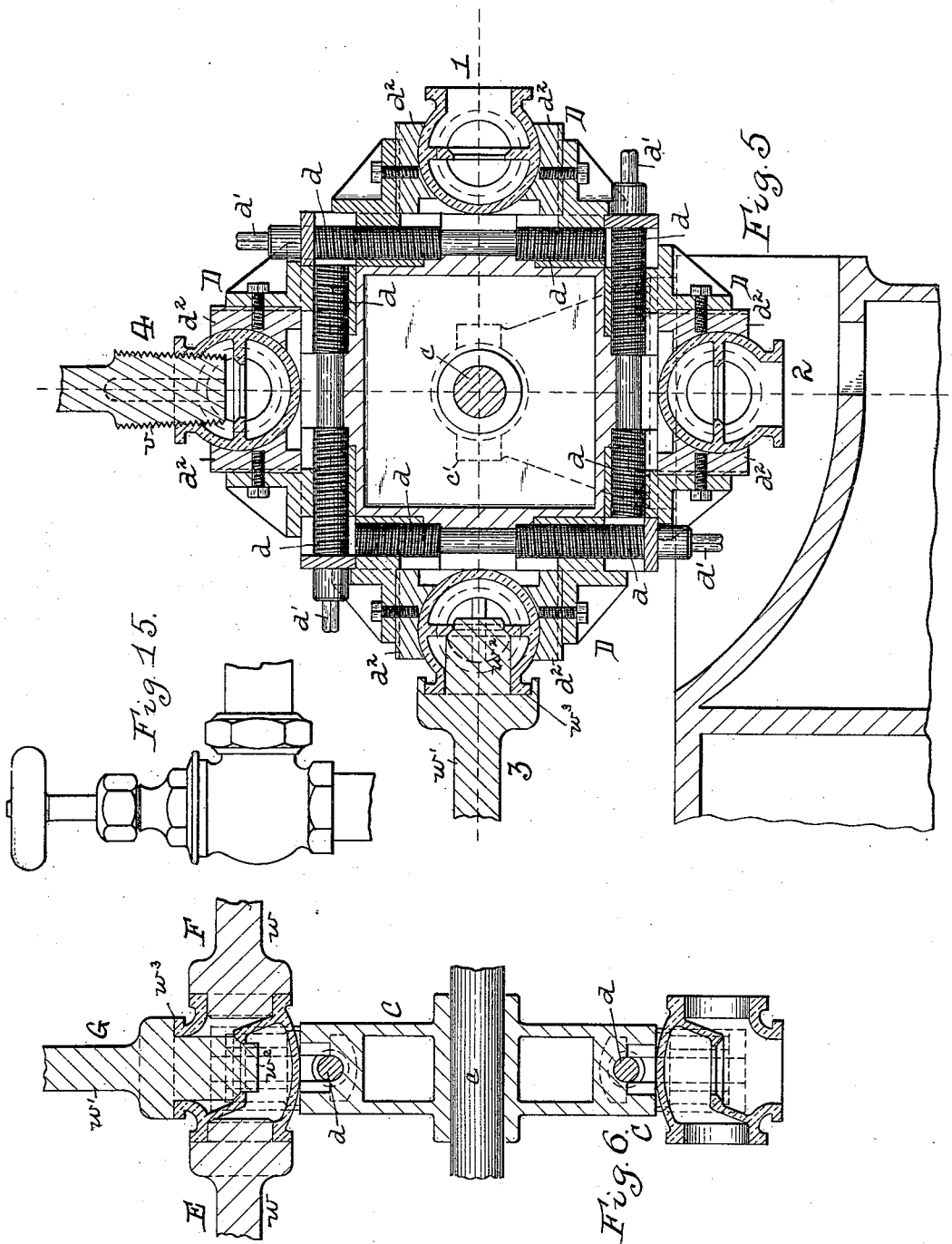
Witnesses:
Luella H. Knox.
Wm J. Martin.
Inventor
Lewis D. Castle.
By Kay, Totten & Cooke,
Attorneys.

UNITED STATES PATENT OFFICE.

LEWIS D. CASTLE, OF GREENSBURG, PENNSYLVANIA, ASSIGNOR TO JOHN T. KELLY, OF BROOKLYN, NEW YORK, AND GEORGE M. JONES, OF PITTSBURG, PENNSYLVANIA.

MACHINE FOR REAMING AND TAPPING VALVES.

SPECIFICATION forming part of Letters Patent No. 512,155, dated January 2, 1894.

Application filed June 19, 1893. Serial No. 478,145. (No model.)

*To all whom it may concern:*

Be it known that I, LEWIS D. CASTLE, a resident of Greensburg, in the county of Westmoreland and State of Pennsylvania, have invented a new and useful Improvement in Machines for Reaming and Tapping Valves; and I do hereby declare the following to be a full, clear, and exact description thereof.

My invention relates to machines for reaming, facing off, and tapping the three openings of globe, angle, radiator, and gate valves, cocks, &c. It is well known that these valves are made with three openings, two to receive the pipe ends of the pipe, and one, known as the bonnet end, through which the valve enters the valve body, and in globe, angle and radiator valves seats itself against the seat within the valve body. In gate valves there is also a like opening at right angles to the other openings to which the pipes are connected which requires to be reamed, faced and tapped in order to receive the bonnet, the slide of the gate valve being inserted through this opening. It is of course important, especially in angle valves and practically in all valves, that these several openings shall bear certain relations to each other and be either exactly parallel with or exactly at right angles to each other; that is, that in globe valves, the pipe ends shall be exactly parallel in order that when pipes screw into the same they will not be turned in any way out of a straight line, or, in case of angle valves, that an exact right angle shall be formed between the pipes connected to the pipe ends, and also that the bonnet end shall occupy the same position with relation to the other or pipe ends of the valve body. A further reason for this requirement is that the castings are made so that the opening of the bonnet end and the valve seat are in exact line with each other, and if there is liability of the valve being turned from that line, the tools in reaming the mouth of the bonnet will not properly ream and finish the valve seat.

The object of the present invention is to provide a machine in which the three openings of the valves shall be first simultaneously reamed and faced off, and, if necessary, such as in globe, angle and radiator valves, the valve seat reamed, and that then in the same machine the three openings of the valve shall be simultaneously tapped, so finishing the valve in one machine and without unclamping it; the reaming and the facing and the tapping of the three valve openings being finished to the exact shape and exact angular relations to each other, and all hand labor in the finishing of the valves, except the feeding and removing of the valves from the machine, being done away with.

The apparatus comprises, generally stated, a revolving chuck for carrying the valves, three sets of reaming spindles arranged two on the same line and one at right angles thereto in the proper position with relation to the chuck for reaming the valve openings, and suitable mechanism for feeding and withdrawing such reaming tools, and three sets of tapping spindles arranged on another plane, two of such spindles on the same line and one at right angles thereto, but on a different plane from the reaming spindles, whereby the valve bodies can be first carried to the reaming spindles and reamed and upon the next movement of the chuck be brought into position for operation upon by the tapping spindles, and the valves thus finished.

The particular points of invention desired to be covered will be hereinafter set forth and claimed.

To enable others skilled in the art to make and use my invention, I will describe the same more fully, referring to the accompanying drawings in which—

Figure 1 is a plan view of the machine. Fig. 2 is a face view thereof. Fig. 3 is an end view. Fig. 4 is a vertical central cross section, some of the parts being shown in full lines. Fig. 5 is an enlarged longitudinal section of the chuck showing the valves in position for the reaming and tapping operations. Fig. 6 is a cross section thereof showing the three facing and reaming spindles in their completed positions. Fig. 7 is a like view of the chuck at right angles to Fig. 6, showing the three tapping spindles engaging with the valves. Fig. 8 is a section on the line 8—8 Fig. 4. Fig. 9 is a section on the line 9—9 Fig. 4. Fig. 10 is a detail view showing the operation of the side tapping spindles and their cams. Fig. 11 is a like view showing the operation of the side reaming spindles and their cams. Fig. 12 is a detail view which shows the manner of operating the clutch, and Figs. 13, 14, and 15 are views of globe, gate and radiator valves respectively.

Like letters and figures of reference indicate like parts in each view.

The frame A of the machine is cast to shape and has mounted therein the power shaft B which carries the pulleys B′ B² thereon, and which shaft extends in toward the central part of the machine, the inner ends being mounted in the bearings $b$, and the outer end next to the pulleys being mounted in the bearing $b'$. The revolving chuck C, shown in the enlarged views Figs. 5, 6 and 7, is secured upon the spindle $c$ which is mounted in the bearings $c'$; the shaft $c$ carrying the dial plate C′ which has four seats $c^2$ spaced equally from each other on the dial face and corresponding exactly in position to the valve secured upon the chuck, while the pin $c^3$ mounted in bearings on the machine frame and connected to the hand lever $c^4$ engages with the dial plates C′ so as to hold the same in exact position but upon the withdrawal of the pin from the dial seats permitting the turning of the chuck which is done by hand. In this way the chuck carrying the different valves may be brought into the exact desired position. The chuck itself has four sets of clamps D which are operated by threaded bars $d$, said bars having right and left hand threads engaging with the jaws, and has the angular wrench end $d'$ to be engaged by a suitable wrench so as to open and close the clamping jaws. The clamping jaws have suitable linings $d^2$ which are removable and correspond in shape to the valve bodies and are secured to the jaws according to the size and shape of the valve body to be operated upon. It will be noticed that the chuck has four clamps and, as shown in Fig. 5, these four clamps occupy proper positions so that a valve is inserted in the position 1. It is then carried downwardly to the position 2, where it is not operated upon, and is then brought into the position 3 where it is reamed and faced, and then carried to the position 4 where it is tapped; and the operator's sole duties in the running of the machine are to secure the valve bodies in the position 1 and turn the chuck successively for quarter turns into the other positions until the one valve body is finished, inserting a valve body at the position 1 at each quarter turn, and when the first valve is finished removing that valve and inserting another in its place and turning the chuck the quarter turn, continuing this as long as the machine is in operation.

On the same horizontal plane as the shaft $c$ of the chuck, and in position to operate upon the valve body when in the position 3, above illustrated, are the reaming and facing spindles E, F and G, the spindles E F being in line with each other and adapted to operate upon the end openings of the valve body, while the spindle G is at right angles to the spindles E F and adapted to operate upon the opening at right angles to the other openings in the valve, at the positions of the reaming and facing tools carried by the spindles when operating upon the valve body being shown in Fig. 6. On the same vertical plane as the shaft $c$ of the chuck, and in position to operate upon the valve body when in the position 4 above illustrated, are the tapping spindles H, I and J, the spindles H and I being in the same line, while the spindle J is at right angles thereto, the positions for the tapping tools carried by the three spindles when operating upon the valve body being clearly shown in Fig. 7.

I will first describe the method of operating the reaming spindles and then the method of operating the tapping spindles, tracing the connections to the several spindles through the machine and keeping the parts separate as far as possible. The power shaft B carries a pinion $e$ which meshes with the gear wheel $e'$ which has a feather connection with the shaft E and rotates the same continuously, and this gear wheel $e'$ meshes with a gear wheel $e^2$ on the shaft $e^3$ which carries at the other end the beveled gear wheel $g$ meshing with the beveled gear $g'$ having a feather connection with the reaming spindle G; the beveled gear $g'$ also meshing with the beveled gear $g^2$ upon the shaft $g^3$ which also carries the gear wheel $g^4$ which meshes with the gear wheel $f$, which has a feather connection with the reaming spindle F; the power being thus carried from the power shaft B through the pinion $e$, gear wheels $e'$ $e^2$, beveled gears $g$ $g'$ $g^2$, and gear wheels $g^4$ and $f$, to the several reaming spindles and rotating the same at a uniform speed. On the shaft $e^3$ close to the beveled gear $g$ is the gear wheel $e^4$ (which meshes with the gear wheel $k'$ on the shaft $k$ (see Fig. 4), said shaft carrying the worm $k^2$ which meshes with the worm wheel $k^3$ on the cam shaft L, said shaft carrying the operative cams for giving the desired movement to all the spindles, both the reaming spindles and the tapping spindles.

I will first describe the method of operating the reaming spindle G, the mechanism for operating that spindle giving a better idea of the general mechanism for operating the reaming spindles, which will be referred to later. At the rear end of the shaft L is the cam $l$ which engages with the vertical slide $l'$ carrying a friction wheel at the lower end thereof, said slide moving in the bearing $l^2$ and connected by a bracket at its upper end to the pitman $l^3$, which pitman connects at its lower end to the crank lever L′ mounted in the bracket L², the opposite end L³ of the crank lever L′ being connected to a collar G′ on the rear end of the reaming spindle G, and so moving the same longitudinally while the reaming spindles rotate. The shape of the cam $l$ is shown in Fig. 8. Its operation is to raise the slide $l'$ which through the pitman $l^3$ raises with it the crank lever $L'$ and so through the arm $L^3$ thereof forces forward the reaming spindle. When the highest point of the cam $l$ passes the slide $l'$ it permits it to descend and the weight of the slide, together with the weight of the crank lever $L'$, is generally sufficient to withdraw the reaming spindle, but if this weight is not sufficient, a suitable weight may be added to the slide $l'$ by the rod extending above the slide and carrying the weight or ball $l^4$, so acting by its weight to hold the slide in contact with the cam $l$ and provide for the withdrawing of the reaming spindle G. The cam $l$ has two operating faces on it, as shown in Fig. 8, the cam operating to feed in and withdraw the reaming spindle twice during one revolution of the cam.

The cam shaft L carries a series of cams at its forward end, one cam $m$ for operating the side reaming spindles, one cam $n$ for operating the side tapping spindles, one cam $p$ for operating the center tapping spindles, and the cam $q$ for operating the clutch for reversing the tapping spindles. The shape of the cam $m$ is shown in Fig. 11, and it operates upon two arms $m'$ carried by the crank levers M which are mounted in the upper part of the frame and have the arms $M'$ which are connected to the crank levers $M^2$ by a sliding and knuckle joint, as at $m^2$, said crank levers $M^2$ being mounted in brackets $m^3$ and carrying the arms $m^4$ which engage with collars $m^5$ on the side reaming spindles. The cam $m$ has, as shown in the enlarged Fig. 11, the two engaging faces $m^6$ of suitable shape to force out the crank levers M and through the crank levers $M^2$ give the necessary advancing motion to the side reaming spindles E F, and the said crank levers M $M^2$ are so mounted that the weight of their horizontal arms $M'$ $M^3$ thereof will operate to hold the pins $m'$ in contact with the cams and to withdraw the side reaming spindles, but if the weight of such parts is not sufficient, the arms $M^3$ of the levers $M^2$ may carry weights, as shown at $M^4$, for this purpose. It will thus be seen that, as the reaming spindles are driven continuously, they are advanced through their driving gear wheels by the rotation of the cam shaft L through the gear wheels $e^4$ $k'$, shaft $k$, worm $k^2$, and worm wheel $k^3$, and that as the cam shaft L is rotated it advances the center reaming spindle G through the cam $l$ and the mechanism above described, and the side reaming spindles E F through the cam $m$ and the mechanism above described, and the weights of the levers in their different positions above described serve to withdraw the several reaming spindles. It will also be seen that these parts are fed forward and withdrawn twice during each revolution of the cam shaft.

It is of course understood that one of the reaming spindles, such, for example, as the center reaming spindle, carries a reaming tool which not only serves to face and ream the bonnet end of the valve but passes into the same to ream and finish the valve seat, this being shown in Figs. 4, 5 and 6. The longitudinal movement of these spindles is regulated so as to feed in that particular reaming tool, as the reaming tool $w'$, so as to ream the valve seat, and the longitudinal stroke of the reaming tool is of sufficient length for this. In the reaming of gate valves, however, the bonnet end of the valve body is much longer than the ordinary globe valve, and it is necessary to provide space to receive such long bonnet end, as the machine would not have sufficient space to receive this long end and have the long stroke above described. To overcome the necessity of this long stroke in the center reaming spindle, which would always be the spindle employed for finishing the bonnet end of gate valves, I shorten up the stroke by connecting the link $l^3$ to the upper hole or seat $l^5$ of the slide $l'$, so reducing the stroke of that reaming spindle by holding up the slide in such position that it is not engaged with the cam $l$, except in the latter part of its stroke, so that the slide and the parts operated by it have only the necessary short stroke for facing the bonnet end of the valve and entering a slight distance within the same for the reaming action.

The tapping spindles H I J are driven in the following manner: On the power shaft B is a pinion $s'$ which engages with the gear wheel $s^2$ running loosely on the clutch shaft $s$, said clutch shaft carrying the clutch Q. On the power shaft B is also a pinion $s^4$ which meshes with a long pinion $s^5$ mounted on a stud on the machine frame, the long pinion $s^5$ meshing with the loosely running gear wheel $s^3$ on the clutch shaft $s$, the gear wheels $s^2$ $s^3$ thus being arranged to rotate in opposite directions. The clutch Q is operated by the cam $q$ through the rod $q'$ mounted in guides $q^2$ $q^3$ on the frame and held against the cam by a spiral spring $q^4$, as shown in Fig. 12; the spring $q^4$ being of sufficient strength to throw the clutch Q, said spring being confined around the rod between a guide $q^3$ and a collar $q^5$ on the rod $q'$. The rod $q'$ engages with the clutch lever $Q'$, passing through the sleeve $q^6$ at the end thereof and pressing against the leaf spring $q^7$ secured to the body of the lever $Q'$ and sufficiently rigid to hold the parts in place, but yielding in case the clutch faces do not immediately engage. The clutch is thus thrown twice during each half rotation of the cam $q$, once into the gear wheel $s^2$ by the positive movement of the cam $q$, and once into the gear wheel $s^3$ by the spring $q^4$ when the position of the cam $q$ permits it. The clutch shaft $s$ carries the pinion S which gears with the gear wheel $h$ having a feather connection with the tapping spindle H. This gear wheel $h$ also gears with the gear wheel $h'$ carried on a shaft $h^2$ which carries the beveled gear wheel $h^3$, said beveled gear wheel meshing with the beveled gear $j$ having a feather connection with the center tapping spindle J. The beveled gear $j$ also meshes with a beveled gear $j'$ on the shaft $j^2$ which carries the gear wheel $j^3$ meshing with the gear wheel $i$ having a feather connection with the tapping spindle I. It is thus seen that all of the tapping spindles are driven from the clutch Q through the pinion S and then through the train of gears above described, so that they all rotate in the same direction at the same time, and when the clutch is in engagement with the gear wheel $s^3$ the tapping spindles will be rotated in the proper position to cause the taps to enter the valve, and when the clutch is thrown into engagement with the gear wheel $s^2$, the taps will be rotated so as to screw out of the valve after it is tapped or threaded.

The cams for advancing the tapping spindles are shown at $n\ p$, Fig. 4, and also in the enlarged view, Fig. 9, the rear cam $p$ operating the center tapping spindle, while the forward cam $n$ operates the side tapping spindles. The cam $n$ is shown in Fig. 10, and the two cams $n$ and $p$ are exactly the same shape, each having two operating faces, and one cam face of the cam $n$ operating to advance the tapping spindle on one side, and then operating to advance the tapping spindle on the other side, while one cam face of the cam $p$ operates to advance the center tapping spindle, and its other face when in the lowest position is idle. The center tapping spindle is withdrawn by a weight, and the side tapping spindles are withdrawn by springs.

I will first describe the operation of advancing the center tapping spindle. The slide $p'$, which has its friction wheel in contact with the cam $p$ and which is mounted to slide in the bearings $p^2$, has connected thereto the rod $p^3$ which extends up through a bracket $p^4$ and carries at its upper end the weight or ball $p^5$, the rod $p^3$ passing through a sleeve $t'$ at the end of the lever $t$ which is mounted in the bracket $t^2$ and engages at its opposite end with the collar $t^3$ mounted loosely on the upper end of the center tapping spindle J. As the cam $p$ raises the slide $p'$ and rod $p^3$ and the weight $p^5$, it frees the lever $t$ from said weight, when the weight of the tapping spindle J will cause the same to lower and enter the valve mouth to be tapped, and as the shaft is rotated the tap carried by the spindle will properly cut a thread therein, but as soon as the tapping spindle is reversed and the slide $p'$ passes beyond the cam face of the cam $p$, the weight $p^5$ will descend and rest upon the opposite end of the lever $t$, and this weight is sufficient to raise the tapping spindle and it therefore exerts the proper force for withdrawing the tapping spindle from the valve after the thread has been cut therein.

The cam $n$ by its cam faces operates upon the inner ends of the rods $n'$ which carry spiral springs $n^2$ confined between the brackets $n^3$ and the collars $n^4$ on the rods, such springs being employed to withdraw the tapping spindles, as hereinafter described. The rods $n'$ slide in brackets $n^3$ and $n^5$ secured to the machine frame so as to be held in proper line for engagement with the cam faces of the cam $n$. The rods $n'$ also pass through sleeves $u'$ on the levers $u$, which are mounted in suitable brackets $u^2$, and the opposite ends of which engage with sleeves $u^4$ at the outer ends of the tapping spindles H and I respectively. At the ends of the rods $n'$ are the nuts $n^5$ which serve to withdraw the levers $u$, pressing against the sleeves $u'$ and so exerting the necessary force to withdraw the tapping spindles as soon as the rods $n'$ are free from the pressure of the cam $n$. It will be noticed that the rods $n'$ do not press directly against the levers $u$, but that said levers carry leaf springs $u^5$ which are secured to the bodies of the levers $u$ and extend out in front of the rods $n'$. These springs have sufficient strength normally to cause the movement of the levers $u$ with the rods $n'$, and so to exert the necessary pressure to feed in the taps when cutting the threads in the valve bodies, but in case of any obstruction in the way of the taps, these springs $u^5$ will yield so as to permit the rods to slide through the sleeves $u'$ and prevent a breaking strain coming on the levers $u$ or any part of the machine, the springs therefore saving the machine from breakage in case of such abnormal pressure.

In arranging the machine for operation, clamps of proper shape and contour for holding the valve bodies are secured within the jaws D and the proper reaming tools $w\ w'$ are secured to the reaming spindles, the reaming tools $w$ being of the proper shape for reaming and facing the pipe ends of the valve bodies, and the reaming tool $w'$ being of the proper shape for reaming and facing the bonnet end and reaming the seat thereof. Suitable taps $v$ are secured in the tapping spindles, and the machine is then ready for operation.

The operator stands in front of the machine and secures the valve bodies in proper position in the chuck C, as above described, securing one valve body in place and turning the chuck for a quarter turn, then securing another valve body in place and turning the chuck for another quarter turn so as to bring the first valve in line with the reaming spindles. He then starts the machine, and during the time that the valve body is being reamed secures another valve body in the chuck. As the machine is operated the reaming spindles are rotated by the means above described, and by means of the cams $l$ and $m$ on the cam shaft L, the several reaming spindles are fed forward through the mechanism above described, and act to face and ream the valve body, the reaming tools $w$ entering the pipe ends, and, if desired, the reaming tools may be arranged to ream or trim the outer faces of the pipe ends. The reaming spindle $w'$ is fed forward into the bonnet end of the valve body, and the extension $w^2$ thereof reams and finishes the seat of the valve, while the faces $w^3$ thereof turn off the faces of the bonnet end. As soon as the pressing faces of the cams $l\ m$ pass the slides or bearing faces of the lever mechanism and free the same, the weight of the levers, or weights attached thereto, act in the manner above described to withdraw the reaming tools from the valve body. While this reaming operation takes place the taps mounted in the tapping spindles are operating upon the valve, which is in the position 4 of Figs. 4 and 5, the tapping spindles being driven from the power shaft through pinion $s^4$, long pinion $s^5$, gear wheels $s^3$, clutch Q, pinion S, gear wheel $h\ h'$, bevel gears $h^3$, $j\ j'$ and gear wheels $j^3$ and $i$, in the first part of the operation the cam $p$ in the shaft L engaging with slide $p'$, and the cam $m$ in said shaft engaging with the rods $n'$ through the mechanism above described, freeing the tapping spindle J so that it will enter by its own weight and tap the valve opening at right angles to the other valve openings, and the rods $n'$ through their connection with the levers $n$ and the springs $u^5$ feeding in the taps $v$ into the other valve opening, this being continued until the pressing faces of the cams $n\ p$ pass the rods $n'$ and slide $p'$ respectively, and at the same time the clutch cam $q$, through the mechanism above described, throws the clutch Q into engagement with the gear wheel $s^2$, which is driving the gear wheel $s$, so reversing the movement of the gearing and the direction of rotation of the tapping spindles. At the same time, through the weight $p^5$ resting on the lever $t$, the tapping spindle J is raised, and the springs $n^2$, upon the rods $n'$ give the necessary pressure to cause the withdrawal of the tapping spindles H I. In case of any obstruction in the way of the tapping spindles, such, for example, as the moving of the valve body in its clamp so that it is not properly presented to the tapping spindles, or from other cause, the breaking of any of the parts of the tapping mechanism is prevented for the reason that the ends of the rod $n'$ press upon the springs $u^5$ to give the necessary entering pressure for the taps, and such springs, while of sufficient stiffness to cause the feeding action, will yield and prevent fracture of any of the parts of the tapping spindles. At the same time all danger of like injury in connection with the center tapping spindle is overcome, because that spindle feeds inwardly by its own weight, and the action of the cam is simply to relieve the spindle from the weight $p^5$ and permit it, by its own weight, to cause the tapping of the valve, and in case the tap carried by the spindle encounters any obstacle, as it is not fed forward by positive mechanism there is no liability of injury to the machine. It is to be noticed that the bracket for the lever $t$ of the center tapping spindle and the bearings for the levers $u$ of the side tapping spindles have each two pivotal holes, such as at $y\ y'$. They are so constructed in order to provide for a change in the thread to be cut, whether coarse or fine, the lever being shifted in the bearing to regulate the feed approximately to the thread to be cut through. For the reasons above set forth it is not necessary that the feed should be exactly that of the longitudinal movement of the tapping spindles.

The reaming and tapping operations take place simultaneously and the positions 3 and 4 of Figs. 4 and 5, and during these operations the operator removes the finished valve body at the position 1, secures another valve body in that position, and at the proper time gives the chuck C a quarter turn, bringing the valve which had been in position 3 into the position 4 ready for tapping, and the valve which had been in position 2 into the position 3 ready for reaming, and the operation is again repeated, the operator meanwhile withdrawing the finished valve body from the position 1 and securing another in its place. It will also be seen that by the operation above described I am enabled to rapidly and accurately ream and face the valve bodies, reaming all three of the openings as well as the valve seat at one operation, and insuring that these openings shall all be in exactly the desired angular relation, and I am also enabled to tap and finish all the valve openings at the one operation, the operation which has heretofore required skilled men being reduced to the mere running of the machine and the feeding of the valve bodies to the same, all other operations being performed by the machine itself. I can also operate upon globe, angle, radiator or gate valves, arranging the machine for reaming, tapping and finishing whatever openings are required for the pipe or bonnet ends, and reaming the valve seat in exact proper line with the bonnet end and tapping that bonnet end in exact line with the seat, so that the valve secured the valve within body shall properly seat therein. The machine is also constructed so that all of the parts are in proper position of easy access for the operator; that is, that the driving mechanism is raised above the floor and in position so that the running of the same may be exposed to the view of the operator instead of being inclosed within the bed or covered by plates. This is of especial importance in connection with the cams, all of which are arranged within sight so that the operator can watch their action, see that they are oiled properly and are operating to give the desired motions, all of the mechanism for the peculiar movement of the parts being regulated and controlled by the single cam shaft. These important parts of the apparatus are also raised above the points at which the valves are tapped, this being the principal source of chips and cuttings which might interfere with the action of the cams, and on a line with the tapping operation, and in such position that they can be easily protected from any cuttings therefrom.

What I claim as my invention, and desire to secure by Letters Patent, is—

1. The combination of a revolving chuck mounted on a horizontal axis and having clamps for holding valve bodies, three sets of reaming spindles mounted on one plane with the chuck, three sets of tapping spindles mounted on another plane with the chuck, a separate dial plate secured to the shaft carrying the revolving chuck, and a stop engaging with the dial plate, substantially as and for the purposes set forth.

2. The combination of a chuck for holding a valve body, side reaming spindles in line with each other, and a center reaming spindle at right angles thereto, automatic mechanism for rotating the reaming spindles and advancing the same, and mechanism for adjusting the length of stroke of the center reaming spindle, substantially as and for the purposes set forth.

3. The combination of a chuck, a rotating reaming spindle, and mechanism for advancing and retracting the same, said mechanism consisting in a cam and a vertically moving slide mounted in a vertical guideway and engaging with the cam and a crank lever connecting the slide and spindle, and the parts being retracted by the weight of the slide and crank lever, or parts carried thereby, substantially as and for the purposes set forth.

4. The combination of the rotating reaming spindle G, the cam $l$, the slide $l'$, link $l^3$, crank lever $L'$ and weight $l^4$ connected to the slide $l'$, substantially as and for the purposes set forth.

5. The combination of a rotating reaming spindle, the cam $l$, the vertically moving slide $l'$, having two connecting seats at its upper end, the pitman $l^3$, and the crank lever $L'$ connecting said pitman and the reaming spindle, substantially as and for the purposes set forth.

6. The combination of the side reaming spindle, the cam $m$ for driving the same, the crank lever M, and the crank lever $M^2$ having a sliding and knuckle joint with the crank lever M, and engaging with the side reaming spindle, substantially as and for the purposes set forth.

7. The combination of the side reaming spindle, the cam $m$ for driving the same, the crank lever M and the crank lever $M^2$ having a sliding and knuckle joint with the crank lever M and engaging with the side reaming spindle, said crank levers M and $M^2$ being mounted on horizontal axes, and serving by the weight of their arms $M'$ and $M^3$ to withdraw the side reaming spindle, substantially as and for the purposes set forth.

8. The combination of the rotating chuck for carrying valve bodies, a series of reaming spindles adapted to operate upon the valve body when in one position, a series of tapping spindles adapted to operate on the valve body when in another position, and a cam shaft above the chuck and out of line therewith and carrying a series of cams adapted to advance the reaming spindles and the tapping spindles from one central point, substantially as and for the purposes set forth.

9. The combination of a vertical tapping spindle, a cam, a vertically moving slide operated by the cam and carrying a weight at its upper end, and a lever connected to the tapping spindle and in the course of the weight of said slide, substantially as and for the purposes set forth.

10. The combination of a vertical tapping spindle, the lever $t$ engaging therewith and carrying a sleeve at its outer end, a cam, a vertically moving slide operated thereby and passing through said sleeve of the lever and carrying a weight above the same, substantially as and for the purposes set forth.

11. The combination of a tapping spindle, a lever engaging with the outer end thereof, and carrying a sleeve at the opposite end thereof, a cam, a rod or slide in the course thereof passing through the sleeve of the lever, and a spring connected to the body of said lever and extending out into the course of said rod, substantially as and for the purposes set forth.

12. In valve finishing apparatus, a lever for transmitting power, having a sleeve at the end thereof, an operating rod extending through said sleeve, and a spring secured to the lever and extending in the course of the rod, substantially as and for the purposes set forth.

13. In apparatus for tapping valves, the combination of a chuck for carrying the valve body, side tapping spindles and a center tapping spindle in the same vertical plane as the valve body, gearing for driving said spindles, a clutch adapted to reversing the movement of the gearing, a cam, a sliding rod in the course of said cam connected to the clutch and carrying a spring, said cam acting to throw the clutch in one direction and the spring acting to throw the clutch in the opposite direction, substantially as and for the purposes set forth.

14. The combination of the driving shaft B carrying the pinion $s'$, meshing with the gear wheel $s^2$ mounted on the shaft $s$, the pinion $s^4$ on the driving shaft B, the long pinion $s^5$, the gear wheel $s^3$ mounted on the shaft $s$, the clutch Q having sliding connection with the shaft $s$, and connections from the said shaft $s$ to the valve tapping spindles, substantially as and for the purposes set forth.

In testimony whereof I, the said LEWIS D. CASTLE, have hereunto set my hand.

LEWIS D. CASTLE.

Witnesses:
J. W. KENNEDY,
R. J. WADSWORTH.